US012725547B2

(12) United States Patent
Byeon et al.

(10) Patent No.: US 12,725,547 B2
(45) Date of Patent: Sep. 1, 2026

(54) POWER MANAGEMENT INTEGRATED CIRCUIT AND ITS DRIVING METHOD

(71) Applicant: LX Semicon Co., Ltd., Daejeon (KR)

(72) Inventors: Jin Su Byeon, Daejeon (KR); Cheol Ho Lee, Daejeon (KR); Yoon Soo Shin, Daejeon (KR)

(73) Assignee: LX SEMICON CO., LTD, Daejeon (KR)

( * ) Notice: Subject to any disclaimer, the term of this patent is extended or adjusted under 35 U.S.C. 154(b) by 0 days.

(21) Appl. No.: 17/862,302

(22) Filed: Jul. 11, 2022

(65) Prior Publication Data

US 2023/0018128 A1 Jan. 19, 2023

(30) Foreign Application Priority Data

Jul. 19, 2021 (KR) ........................ 10-2021-0093909

(51) Int. Cl.
*G09G 3/20* (2006.01)

(52) U.S. Cl.
CPC ....... *G09G 3/20* (2013.01); *G09G 2300/0426* (2013.01); *G09G 2310/0289* (2013.01); *G09G 2310/0297* (2013.01); *G09G 2310/08* (2013.01); *G09G 2330/021* (2013.01); *G09G 2330/028* (2013.01); *G09G 2330/06* (2013.01)

(58) Field of Classification Search
CPC ........................................................ G09G 3/20
See application file for complete search history.

(56) References Cited

U.S. PATENT DOCUMENTS

| | | | | |
|---|---|---|---|---|
| 10,217,395 | B2 | 2/2019 | Ha | |
| 10,810,946 | B2 | 10/2020 | Han et al. | |
| 2010/0123708 | A1* | 5/2010 | Jang | G09G 3/3648 345/87 |
| 2010/0293405 | A1* | 11/2010 | Shen | G09G 5/39 713/401 |

(Continued)

FOREIGN PATENT DOCUMENTS

| | | | |
|---|---|---|---|
| CN | 103426388 | A | 12/2013 |
| CN | 109961732 | A | 7/2019 |

(Continued)

OTHER PUBLICATIONS

Korean Office Action dated Sep. 2, 2025 issued in Patent Application No. 10-2021-0093909 (10 pages).

(Continued)

*Primary Examiner* — William Boddie
*Assistant Examiner* — Andrew B Schnirel
(74) *Attorney, Agent, or Firm* — POLSINELLI PC

(57) ABSTRACT

The present disclosure relates to a power management integrated circuit and a gate clock modulation circuit, the power management integrated circuit including a delay circuit configured to delay, by a preset time, and output an on clock signal for setting an output start time point of a gate driving circuit and an off clock signal for setting an initialization time point of the gate driving circuit; a multiplexer configured to select and output one among delayed signals transferred through signal lines which are connected to the delay circuit; and a gate clock generation circuit configured to generate a gate clock signal by using the on clock signal and the off clock signal outputted from the multiplexer.

10 Claims, 13 Drawing Sheets

(56) References Cited

U.S. PATENT DOCUMENTS

| | | | | |
|---|---|---|---|---|
| 2011/0148954 | A1* | 6/2011 | Tobita | G09G 3/3688 345/698 |
| 2013/0249781 | A1* | 9/2013 | Park | G09G 3/3611 345/99 |
| 2013/0314392 | A1* | 11/2013 | Kim | G09G 3/3266 345/212 |
| 2014/0347344 | A1 | 11/2014 | Lee et al. | |
| 2015/0049076 | A1* | 2/2015 | Kim | G09G 3/20 345/212 |
| 2015/0115813 | A1 | 4/2015 | Hussain et al. | |
| 2017/0193892 | A1* | 7/2017 | Ha | G09G 3/2022 |
| 2019/0197964 | A1* | 6/2019 | Cho | G09G 3/20 |

FOREIGN PATENT DOCUMENTS

| | | | |
|---|---|---|---|
| KR | 10-2014-0137716 | A | 12/2014 |
| KR | 10-2019-0076219 | A | 7/2019 |
| KR | 10-2020-0007317 | A | 1/2020 |
| KR | 2020-0000313 | A | 1/2020 |
| TW | 201040985 | A1 | 11/2010 |
| TW | 201128621 | A1 | 8/2011 |
| TW | 201532022 | A | 8/2015 |

OTHER PUBLICATIONS

Taiwanese Office Action dated Jan. 15, 2026 issued in Patent Application No. 11520053110 (15 pages).

* cited by examiner

POWER MANAGEMENT INTEGRATED CIRCUIT AND ITS DRIVING METHOD

CROSS REFERENCE TO RELATED APPLICATION

This application claims priority from Republic of Korea Patent Application No. 10-2021-0093909 filed on Jul. 19, 2021, which is hereby incorporated by reference in its entirety.

BACKGROUND

1. Field of Technology

The present disclosure relates to a power management integrated circuit for driving a panel of a display device and a display device including the same.

2. Description of the Prior Art

A display device may include a panel capable of displaying an image or sensing a touch by each pixel, a data driving circuit and a gate driving circuit which drive the panel, and a timing controller which controls the driving of each of the data driving circuit and the gate driving circuit.

The timing controller may transmit a gate control signal for the gate driving circuit to control the supply of a scan signal for turning on or off a transistor located in each pixel, and may transmit a data control signal for the data driving circuit to control the supply of a data voltage to each pixel according to the scan signal supplied by the gate driving circuit.

A power management integrated circuit may supply power to components inside the display device, for example, the data driving circuit, the gate driving circuit and the timing controller, so that an electronic device can operate, and may receive the data control signal and the gate control signal generated by the timing controller to change the timing, magnitude and phase of signals transferred to the data driving circuit and the gate driving circuit.

The power management integrated circuit may be electrically connected to the components inside the display device through a processor and an interface to transfer a plurality of clock signals having preset voltages or currents to the components inside the display device.

The conventional power management integrated circuit has a problem in that the operating frequency of a gate driving signal transferred from the gate driving circuit is fixed depending on the timing of the gate control signal transferred from the timing controller to the power management integrated circuit.

Also, when the timing of the gate control signal transferred to the conventional power management integrated circuit is constant, the clock interval of a signal generated by the power management integrated circuit is constant as well. Thus, a problem is caused in that electromagnetic interference increases during the operation of the gate driving circuit.

SUMMARY OF THE INVENTION

Under such a background, various embodiments are directed to providing a power management integrated circuit including a combination circuit which generates a signal for controlling gate driving, through a logic operation without increasing kinds of gate control signals transmitted by a timing controller.

Various embodiments are directed to providing a power management integrated circuit capable of reducing noise generated in a display device, by changing the timing of gate control signals transferred to the power management integrated circuit.

In one aspect, an embodiment may provide a power management integrated circuit including: a delay circuit configured to delay, by a preset time, and output an on clock signal for setting an output start time point of a gate driving circuit or an off clock signal for setting an initialization time point of the gate driving circuit; a multiplexer configured to select and output one among delayed signals transferred through signal lines which are connected to the delay circuit; and a gate clock generation circuit configured to generate a gate clock signal by using the on clock signal and the off clock signal outputted from the multiplexer.

In another aspect, an embodiment may provide a power management integrated circuit including: a gate clock generation circuit configured to receive an on clock signal and an off clock signal including a plurality of pulses and to generate a gate clock signal by using the rising timing of a pulse of the on clock signal and the falling timing of a pulse of the off clock signal; and a gate clock modulation circuit connected to the gate clock generation circuit, and configured to change the rising timing or the falling timing of a pulse of the gate clock signal.

In still another aspect, an embodiment may provide a gate clock modulation circuit including: a gate clock generation circuit configured to receive an on clock signal which defines the output start timing of a gate driving circuit and an off clock signal which defines the output end timing of the gate driving circuit and to generate a gate clock signal; and a delay circuit connected to an input terminal of the gate clock generation circuit, and configured to change the clock timing of the on clock signal or the off clock signal, wherein the delay circuit randomly changes the timing of the on clock signal or the off clock signal.

As is apparent from the above, according to the embodiments, a signal generated by a power management integrated circuit may be efficiently controlled, and the driving time of a gate driving circuit may be reduced.

According to the embodiments, the timing of a gate clock signal generated by the power management integrated circuit may be independently controlled through a logic operation inside the power management integrated circuit.

DETAILED DESCRIPTION OF THE EXEMPLARY EMBODIMENTS

Figure 1:
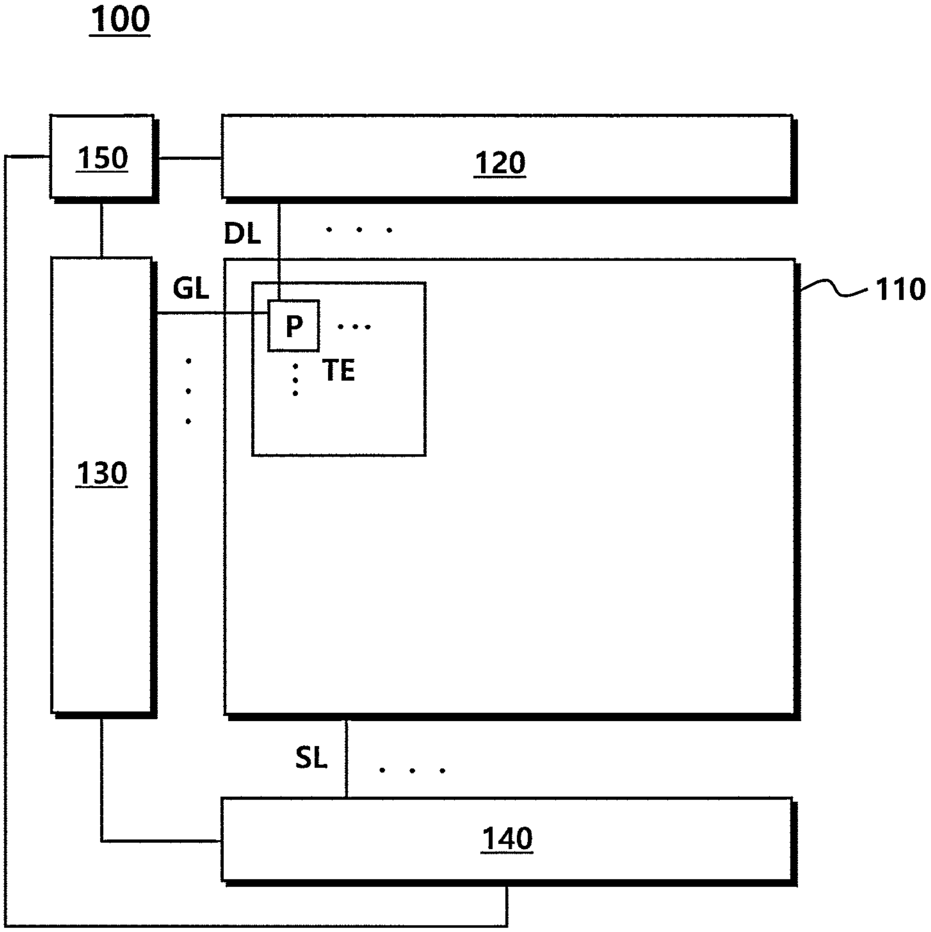
FIG. 1 is a configuration diagram of a display device.

FIG. 1 is a configuration diagram of a display device.

Referring to FIG. 1, a display device 100 may include a panel 110, a data driving circuit 120, a gate driving circuit 130, a touch sensing circuit 140 and a timing controller 150.

The panel 110 may be implemented in the form of a panel of a known type, such as a liquid crystal display panel (LCD panel), an organic light-emitting diode display panel (OLED panel) and so forth.

A plurality of data lines DL which are connected to the data driving circuit 120 and a plurality of gate lines GL which are connected to the gate driving circuit 130 may be formed in the panel 110. A plurality of pixels P corresponding to intersections of the plurality of data lines DL and the plurality of gate lines GL may be defined in the panel 110.

In each pixel P, a transistor, having a first electrode (e.g., a source electrode or a drain electrode) which is connected to the data line DL, a gate electrode which is connected to the gate line GL and a second electrode (e.g., a drain electrode or a source electrode) which is connected to a display electrode, may be formed.

The panel 110 may include a display panel and a touch screen panel (TSP), and the display panel and the touch screen panel may share some components.

The data driving circuit 120 may supply a data signal to the data line DL in order to display an image on each pixel P of the panel 110.

The data driving circuit 120 may include at least one data driving integrated circuit. The at least one data driving integrated circuit may be formed directly in the panel 110, or as the case may be, may be formed by being integrated into the panel 110. If necessary, the data driving circuit 120 may be defined as a source driver or a source driver integrated circuit.

The gate driving circuit 130 may sequentially supply a scan signal to the gate line GL in order to turn on or off the transistor located in each pixel P. When the scan signal of a turn-on voltage is supplied to the pixel P, the corresponding pixel P may be connected to the data line DL, and when the scan signal of a turn-off voltage is supplied to the pixel P, the connection between the corresponding pixel P and the data line DL may be released.

When the scan signal transferred from the gate driving circuit 130 is a gate high voltage VGH, the transistor may be turned on and thus a data voltage may be transferred to the pixel P through the data line DL, and when the scan signal is a gate low voltage VGL, the transistor may be turned off and a charged data voltage may be maintained.

The gate driving circuit 130 may be formed in a TAB (tape automated bonding) method of attaching a printed circuit board, on which a plurality of gate drive integrated circuits (GDIC) are mounted, to a display panel, or in a GIP (gate drive IC in panel) method of directly forming gate drive integrated circuits in a display panel.

The touch sensing circuit 140 may obtain touch sensing data by applying a driving signal to all or some of a plurality of touch electrodes TE which are connected to sensing lines SL.

The timing controller 150 may supply various control signals to the data driving circuit 120, the gate driving circuit 130 and the touch sensing circuit 140.

The timing controller 150 may transmit a data control signal (DCS) which controls the data driving circuit 120 to supply a data voltage to each pixel P, transmit a gate control signal (GCS) to the gate driving circuit 130 or transmit a sensing signal to the touch sensing circuit 140, in conformity with each timing. The timing controller 150 may further include a component other than a timing controller to additionally perform another control function.

The timing controller 150 may receive a timing signal such as a horizontal synchronization signal, a vertical synchronization signal and image data from a host (not illustrated) to generate the data control signal (DCS), the gate control signal (GCS) and so forth.

The gate control signal (GCS) may include a start clock signal (SCLK), an on clock signal (ON_CLK), an off clock signal (OFF_CLK), and so forth.

Figure 2:
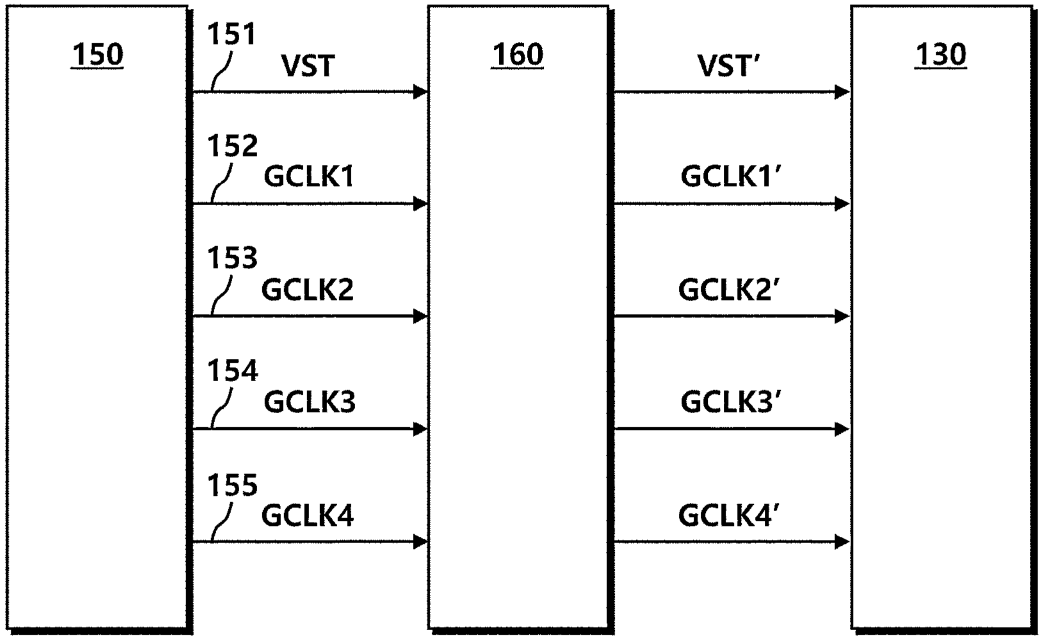
FIG. 2 is a flowchart for explaining kinds of gate control signals transferred from a timing controller to a power management integrated circuit.

FIG. 2 is a flowchart for explaining kinds of gate control signals transferred from a timing controller to a power management integrated circuit.

Referring to FIG. 2, the timing controller 150 may transfer a gate start signal VST and gate clock signals GCLK1 to GCLK4 to a power management integrated circuit 160, and the power management integrated circuit 160 may transfer the gate start signal VST and the gate clock signals GCLK1 to GCLK4 to the gate driving circuit 130.

The power management integrated circuit 160 may transfer signals received from the timing controller 150 to the gate driving circuit 130 as they are. On the other hand, the power management integrated circuit 160 may change the timing, phases and amplitudes of the signals, and may generate and transfer to the gate driving circuit 130 a changed gate start signal VST' and changed gate clock signals GCLK1' to GCLK4'.

Signal lines and communication ports may be formed between the timing controller 150 and the power management integrated circuit 160 as many as the number of signals to be transferred. For example, as illustrated in FIG. 2, five signal lines 151, 152, 153, 154 and 155 and five ports may be formed.

As the number of signal lines formed between the timing controller 150 and the power management integrated circuit 160 increases, the complexity of circuit design increases, and power loss through the signal lines and noise between the signal lines, for example, electromagnetic interference (EMI), increase. Thus, it is necessary to appropriately reduce the number of signal lines.

If necessary, the power management integrated circuit 160 and the gate driving circuit 130 may be configured as one integrated circuit or in a form in which some components are shared, but may be configured as separate integrated circuits. In this case, individual circuit components may be conceptually identified as being connected in the form of an integrated circuit.

Figure 3:
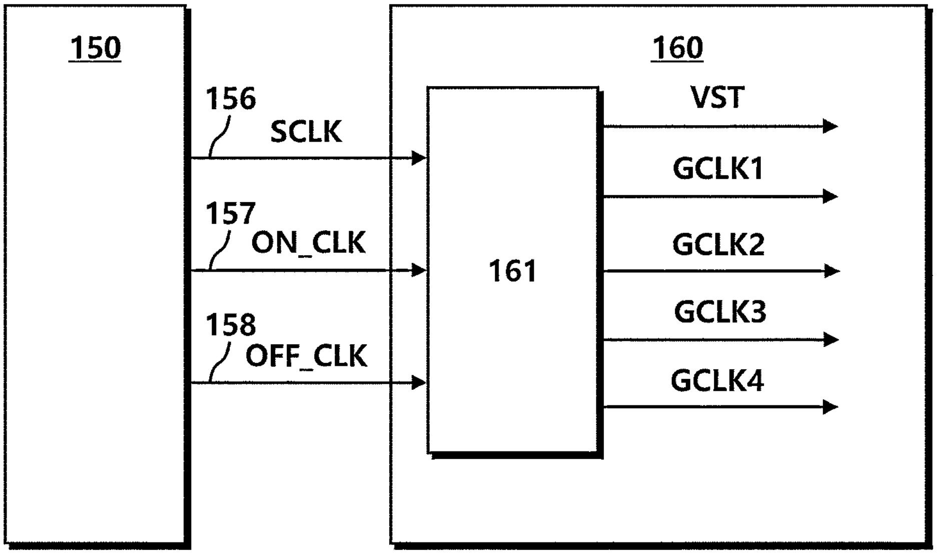
FIG. 3 is a first exemplary diagram for explaining the internal configuration of a power management integrated circuit in accordance with an embodiment.

FIG. 3 is a diagram for explaining the internal configuration of a power management integrated circuit in accordance with an embodiment.

Referring to FIG. 3, the timing controller 150 may transfer a start clock signal SCLK, an on clock signal ON_CLK and an off clock signal OFF_CLK to the power management integrated circuit 160, and the power management integrated circuit 160 may generate gate driving signals by using the start clock signal SCLK, the on clock signal ON_CLK and the off clock signal OFF_CLK through a logic combination circuit 161 and transfer the gate driving signals to the gate driving circuit 130.

As illustrated in FIG. 3, when the kinds and number of signals transferred from the timing controller 150 are reduced and the power management integrated circuit 160 generates signals VST and GCLK1 to GCLK4 through logic operations, the number of signal lines or interfaces for signal transmission between the timing controller 150 and the power management integrated circuit 160 may be reduced, and the number of input/output pins formed between devices may be reduced.

The logic combination circuit 161 in the power management integrated circuit 160 may include a gate clock generation circuit (not illustrated) which generates at least one gate clock signal GCLK by using at least one clock of the on clock signal ON_CLK and the off clock signal OFF_CLK. For example, the number of gate clock signals GCLK generated by the gate clock generation circuit (not illustrated) may be four. However, the present disclosure is not limited thereto, and a plurality of gate clock signals GCLK having various phases may be generated.

Figure 4:
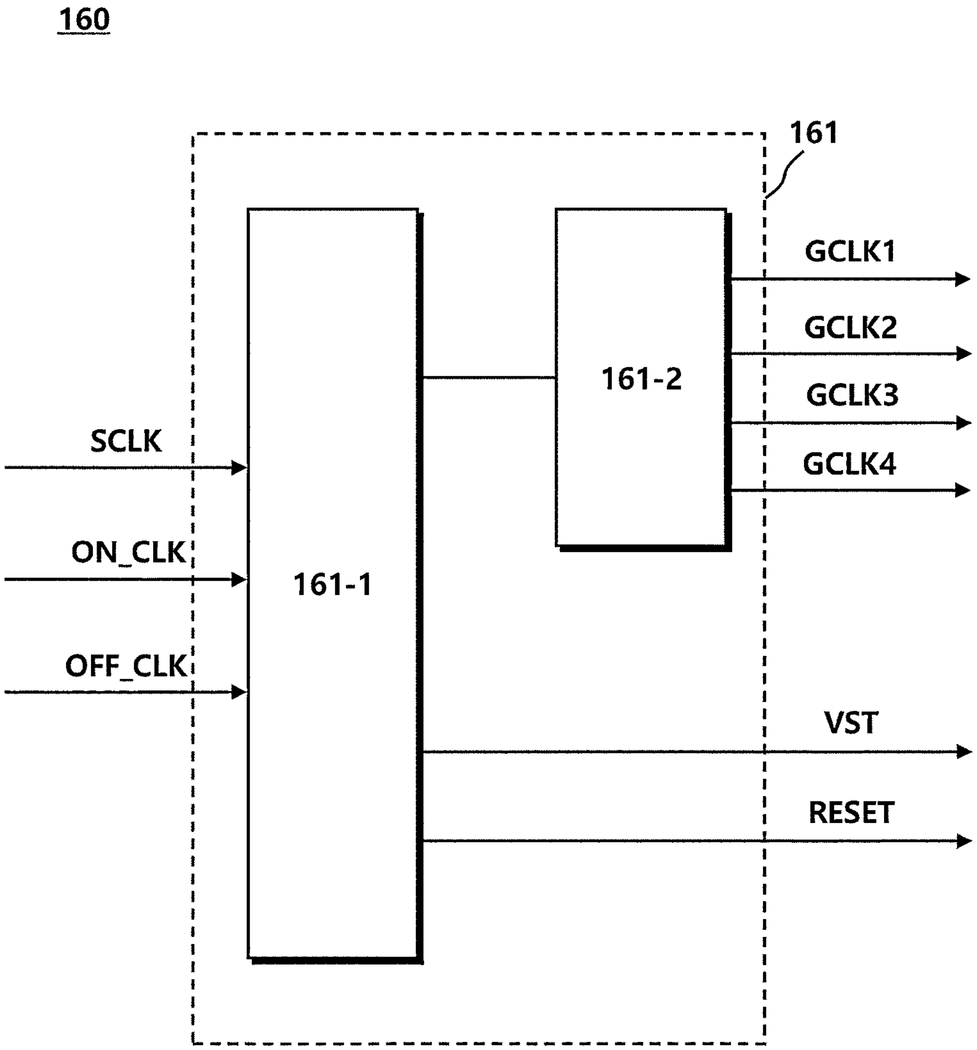
FIG. 4 is a second exemplary diagram for explaining the internal configuration of a power management integrated circuit in accordance with an embodiment.

FIG. 4 is a second exemplary diagram for explaining the internal configuration of a power management integrated circuit in accordance with an embodiment.

Referring to FIG. 4, the logic combination circuit 161 may include a logic circuit 161-1 and a gate clock generation circuit 161-2.

The logic circuit 161-1 may include a level shifter (LS) which may output an inputted signal by adjusting the level thereof, and may adjust the level of the signal before or after a logic operation therein.

The logic circuit 161-1 may receive the start clock signal SCLK, the on clock signal ON_CLK and the off clock signal OFF_CLK and output them as they are, or may output a gate start signal VST and a gate reset signal RESET through separate logic operations.

The gate clock generation circuit 161-2 may generate gate clock signals GCLK1 to GCLK4 by performing logical operations on the start clock signal SCLK, the on clock signal ON_CLK and the off clock signal OFF_CLK transferred from the logic circuit 161-1, but the kind and number of gate clock signals are not limited thereto.

The gate clock generation circuit 161-2 may generate gate clock signals GCLK by using the on clock signal ON_CLK for setting the output start time point of a gate driving circuit and the off clock signal OFF_CLK for setting the initialization time point of the gate driving circuit.

The gate clock generation circuit 161-2 may further include a delay circuit (not illustrated) capable of outputting the on clock signal ON_CLK or the off clock signal OFF_CLK by delaying it by a preset time or outputting the gate clock signals GCLK by delaying them by a preset time. The delay circuit (not illustrated) is not limited thereto as long as it is connected to the input terminal or the output terminal of the gate clock generation circuit 161-2 to adjust the output timing of the gate clock signals GCLK.

The gate clock generation circuit 161-2 may include a multiplexer which controls the start timing of the gate clock signals GCLK by selecting one of a plurality of signal lines connected to the delay circuit.

The gate clock generation circuit 161-2 may include a level shifter (LS) which may output an inputted signal by adjusting the level thereof, and may adjust the level of the on clock signal ON_CLK, the off clock signal OFF_CLK or each of the gate clock signals GCLK which is changed or unchanged.

The connection sequence and arrangement of the logic circuit 161-1 and the gate clock generation circuit 161-2 are not limited thereto, and may be defined by conceptually identifying all or some of internal components as the configuration of another circuit.

Figure 5:
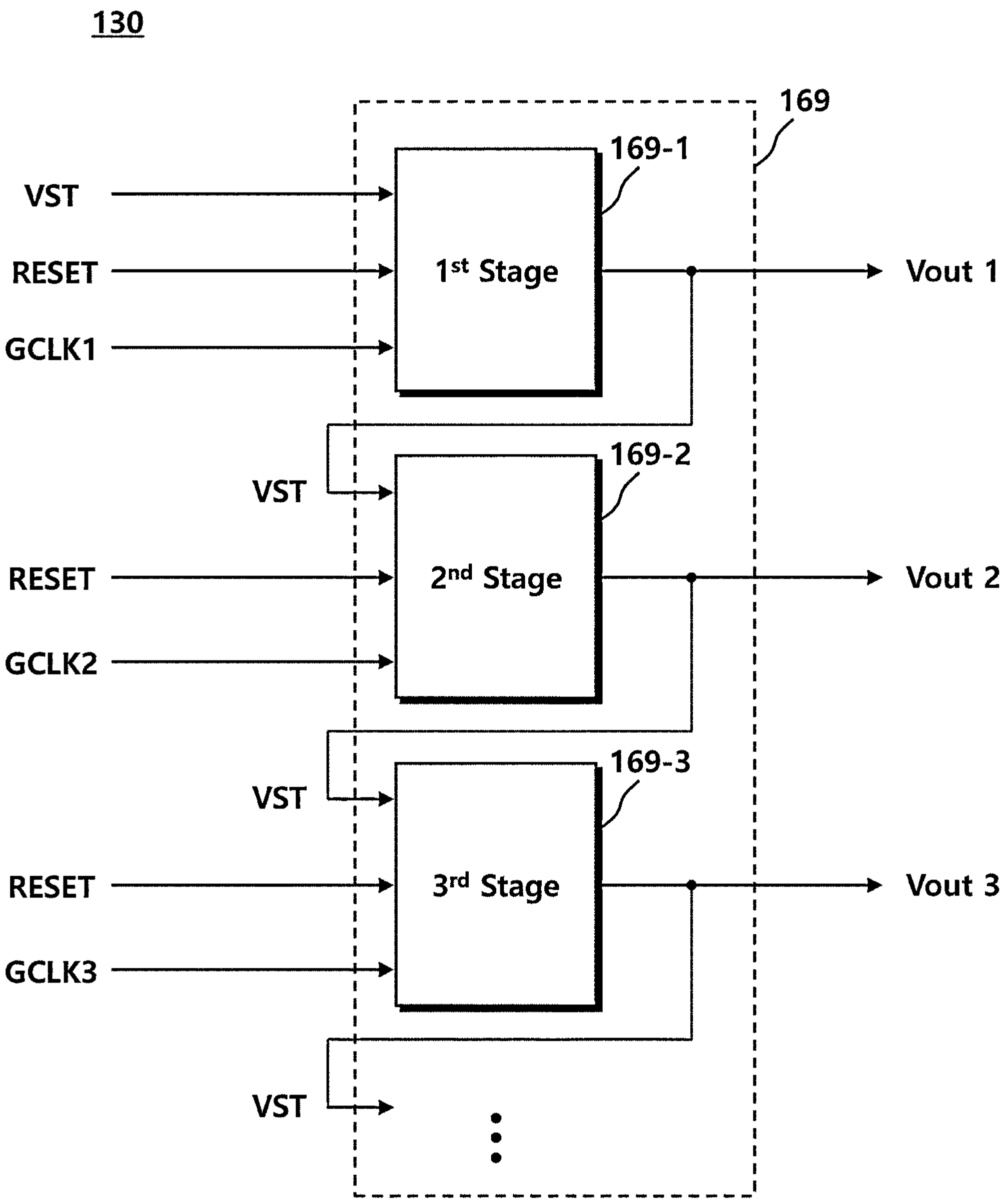
FIG. 5 is a diagram for explaining a gate output stage circuit in accordance with an embodiment.

FIG. 5 is a diagram for explaining a gate output stage circuit in accordance with an embodiment.

Referring to FIG. 5, the gate driving circuit 130 may include a gate output stage circuit 169.

The gate driving circuit 130 may receive the plurality of signals VST, RESET and GCLK1 to GCLK4 generated by the power management integrated circuit 160, and thereby, may transfer a gate driving voltage Vout to the plurality of gate lines.

The gate output stage circuit 169 may be a group in which a plurality of gate output stages are sequentially connected, and, according to the necessity, may include N (N is a natural number equal to or greater than 1) number of gate output stages. In addition, according to the necessity, the gate output stage circuit 169 may further include at least one gate output stage which drives a dummy logic.

The gate output stage circuit 169 may sequentially receive a plurality of gate clock signals each of which is generated by a combination of the on clock signal ON_CLK and the off clock signal OFF_CLK.

A first gate output stage 169-1 may determine a start time point of gate driving by receiving the gate start signal VST, may determine an end time point or an initialization time point of gate driving by receiving the gate reset signal RESET, and may transfer a gate driving voltage to a gate line which is connected to the output terminal of the first gate output stage 169-1.

The first gate output stage 169-1 may determine an output time point of the gate driving circuit by receiving the first gate clock signal GCLK1.

An output voltage Vout of the plurality of gate output stages may be used as a start signal of a next gate output stage. For example, a first output voltage Vout 1 outputted from the first gate output stage 169-1 may be transferred to a second gate output stage 169-2, and may be used as the gate start signal VST.

As illustrated in FIG. 5, each of the first gate output stage 169-1 to a third gate output stage 169-3 may output the output voltage Vout in conjunction with the output timing of a previous gate output stage. In this case, the output voltage Vout 1 of the first gate output stage 169-1 may be transferred to the second gate output stage 169-2 and be used as the gate start signal VST, and an output voltage Vout 2 of the second gate output stage 169-2 may be transferred to the third gate output stage 169-3 and be used as the gate start signal VST.

The gate output stage circuit 169 may be defined as being included in the gate driving circuit 130, but, if necessary, may be defined as being included in the power management integrated circuit 160.

A delay circuit (not illustrated) connected to the input terminal or the output terminal of the gate output stage circuit 169 may change the input timing of the gate clock signal GCLK or the output timing of the gate driving voltage Vout to be outputted.

The delay circuit (not illustrated) may control the timing of a signal by being connected to all or a part of the gate clock input line and the gate driving voltage output line of each output stage.

Figure 6:
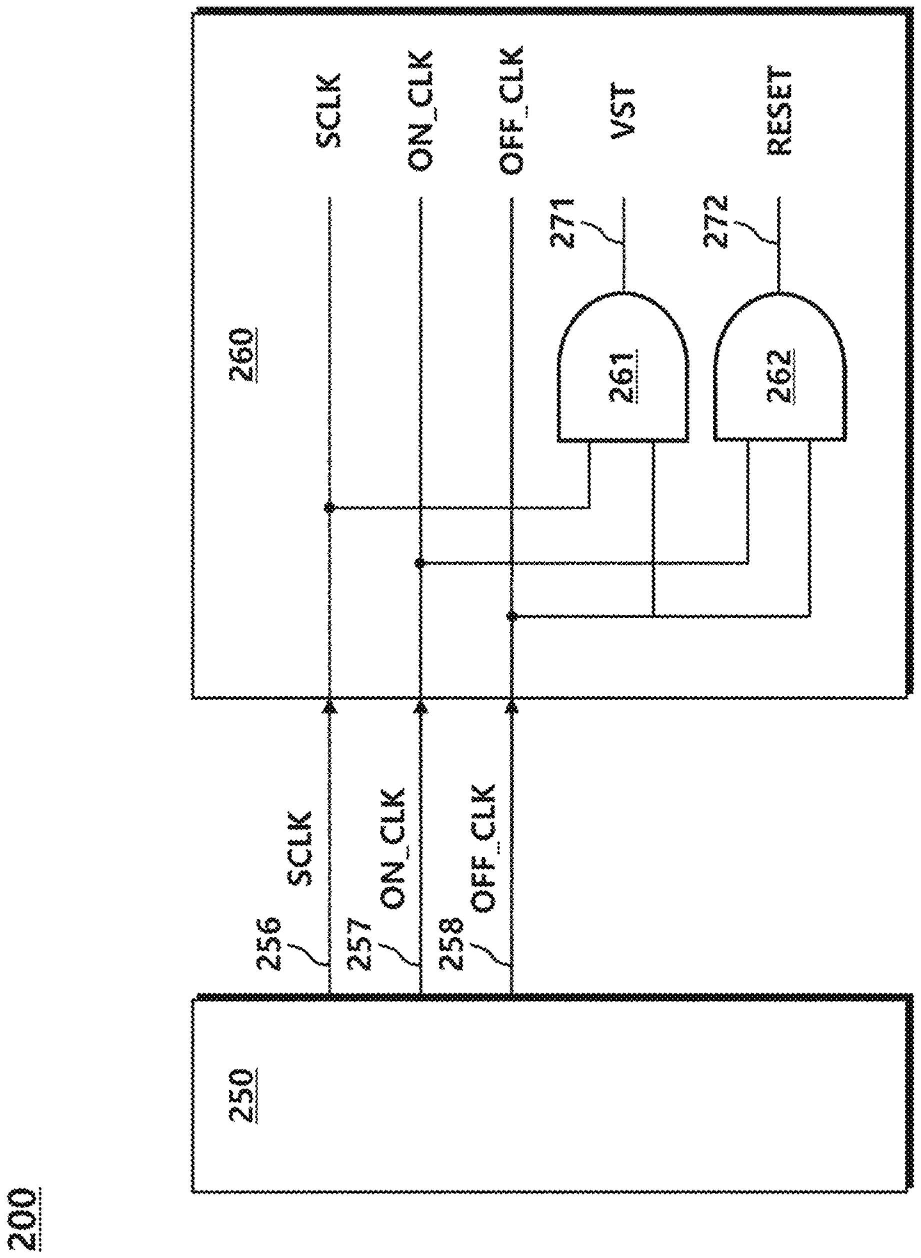
FIG. 6 is a diagram for explaining a power management integrated circuit including an AND gate circuit.

FIG. 6 is a diagram for explaining a conventional power management integrated circuit including an AND gate circuit.

Referring to FIG. 6, a conventional display device 200 may include a timing controller 250 and a power management integrated circuit 260.

The power management integrated circuit 260 may receive a start clock signal SCLK for setting a driving start time point of a gate driving circuit, an on clock signal ON CLK for setting an output start time point of the gate driving circuit and an off clock signal OFF_CLK for setting an output end time point of the gate driving circuit, which are generated by the timing controller 250, and may perform logic operations thereon.

The power management integrated circuit 260 may include a first AND gate circuit 261 which receives the start clock signal SCLK transferred through a start clock line 256 and the off clock signal OFF_CLK transferred through an off clock line 258. The first AND gate circuit 261 may generate and output a gate start signal VST by logically calculating the start clock signal SCLK and the off clock signal OFF_CLK by performing an AND logic operation thereon.

The gate start signal VST may be a signal which is transferred to a gate output stage circuit (not illustrated) to indicate an output start time point of the gate driving circuit.

The power management integrated circuit 260 may include a second AND gate circuit 262 which receives the on clock signal ON_CLK transferred through an on clock line 257 and the off clock signal OFF_CLK transferred through the off clock line 258. The second AND gate circuit 262 may generate and output a gate reset signal RESET by logically calculating the on clock signal ON_CLK and the off clock signal OFF_CLK by performing an AND logic operation thereon.

The gate reset signal RESET may be a signal which is transferred to the gate output stage circuit (not illustrated) to indicate an output initialization time point of the gate driving circuit.

Since the input terminals of the first AND gate circuit 261 and the second AND gate circuit 262 are connected to the off clock line 258, a time period cannot overlap with a gate clock signal GCLK generated by the on clock signal ON_CLK and the off clock signal OFF_CLK. Therefore, in the power management integrated circuit 260 in accordance with an embodiment, a D flip-flop circuit may be inserted, and a power management integrated circuit of a form in which signal lines are changed may be adopted.

In accordance with the embodiment, the power management integrated circuit 260 may include a flip-flop circuit (not illustrated), the first AND gate circuit 261 and the second AND gate circuit 262.

The flip-flop circuit (not illustrated) may receive the start clock signal SCLK for setting a driving start time point of the gate driving circuit and the on clock signal ON_CLK for setting an output start time point of the gate driving circuit, and may perform logic operations thereon. If necessary, the flip-flop circuit may be defined as a latch circuit.

The flip-flop circuit (not illustrated) may receive the start clock signal SCLK through a first terminal (a D terminal) from a start clock line 256, may receive the on clock signal ON_CLK through a second terminal (a C terminal) from an on clock line 257, and may be driven independently of the off clock signal OFF_CLK for setting an output end time point of the gate driving circuit.

The flip-flop circuit (not illustrated) may be a D flip-flop circuit including one inverter which receives the on clock signal ON_CLK and transfers the on clock signal ON_CLK to an internal AND gate circuit and four AND gate circuits which calculate the on clock signal ON_CLK and the start clock signal SCLK.

The first AND gate circuit 261 may generate the gate start signal VST as a result of receiving one of the output signals of the flip-flop circuits and the start clock signal SCLK through separate signal lines and then performing an AND logic operation thereon.

The second AND gate circuit 262 may receive another one of the output signals of the flip-flop circuits and the start clock signal SCLK, may perform an AND logic operation thereon, and may generate the gate reset signal RESET.

The input terminals of the first AND gate circuit 261 and the second AND gate circuit 262 may form a common node to receive the start clock signal SCLK. In this case, the interval and waveform of the pulses inputted to the common node may be the same.

Figure 7:
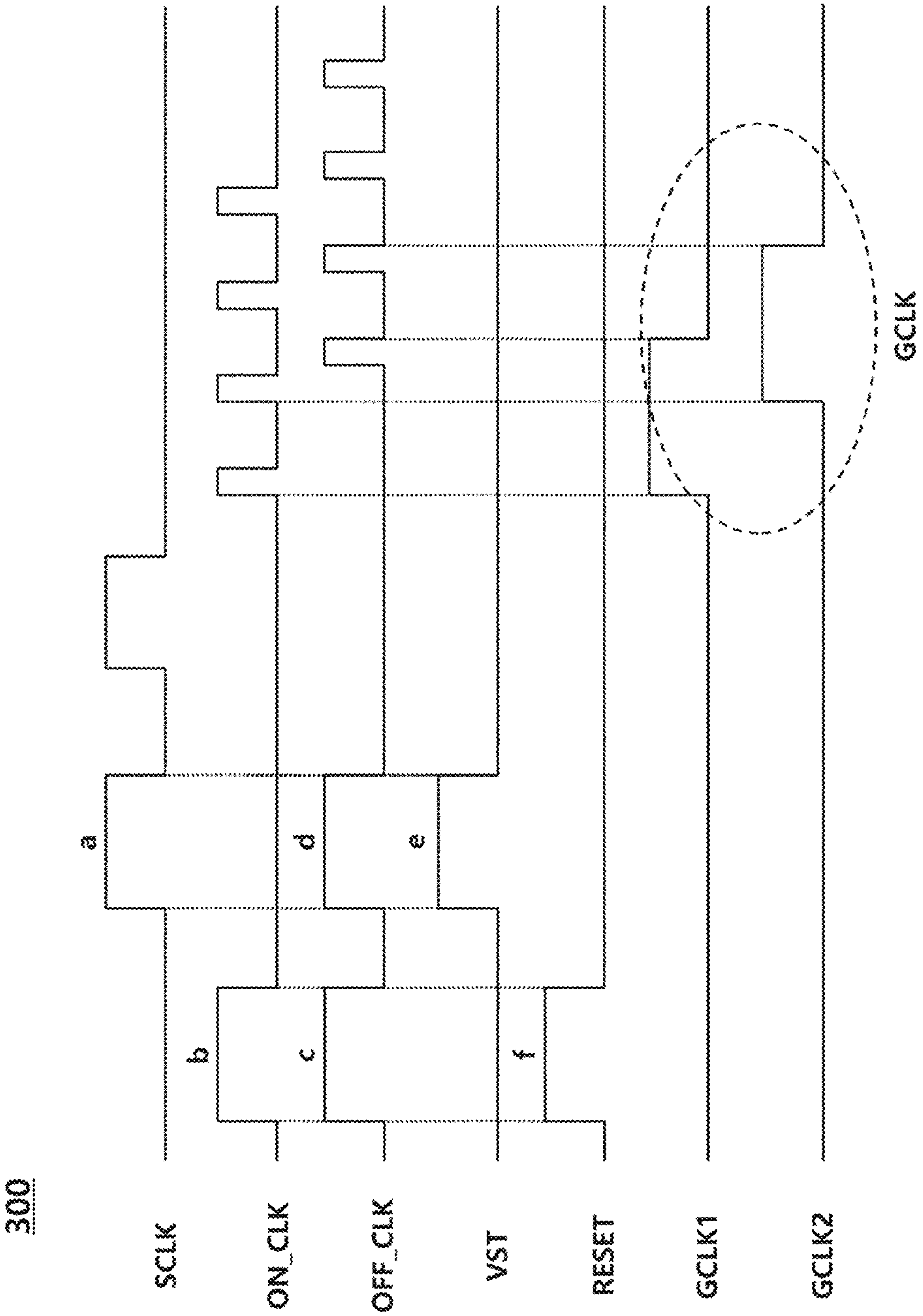
FIG. 7 is a timing diagram of signals supplied to the power management integrated circuit of FIG. 6.

FIG. 7 is a timing diagram of signals supplied to the power management integrated circuit of FIG. 6.

Referring to FIG. 7, a timing diagram 300 of the signals SCLK, ON_CLK and OFF_CLK supplied to the power management integrated circuit and the signals VST, RESET and GCLK generated by the power management integrated circuit is shown.

The start clock signal SCLK may include a plurality of pulses (for example, a time period of a high state may be defined as a pulse), and may include, for example, a first pulse a. The on clock signal ON_CLK may include a plurality of pulses, and may include, for example, a second pulse b. The off clock signal OFF_CLK may include a plurality of pulses, and may include, for example, a third pulse c and a fourth pulse d.

When the start clock signal SCLK, the on clock signal ON_CLK and the off clock signal OFF_CLK are transferred to the power management integrated circuit, the power management integrated circuit may generate the new gate start signal VST and the gate reset signal RESET through the combination of the respective signals.

The power management integrated circuit may generate a fifth pulse e of the gate start signal VST by performing a logic operation on the first pulse a of the start clock signal SCLK and the fourth pulse d of the off clock signal OFF_CLK through an AND gate circuit.

Also, the power management integrated circuit may generate a sixth pulse f of the gate reset signal RESET by performing a logic operation on the second pulse b of the on clock signal ON_CLK and the third pulse c of the off clock signal OFF_CLK through an AND gate circuit.

A gate clock generation circuit (not illustrated) may generate the gate clock signal GCLK by using the on clock signal ON_CLK and the off clock signal OFF_CLK.

The gate clock generation circuit (not illustrated) may generate the gate clock signal GCLK on the basis of the timing of the rising edge of the on clock signal ON_CLK and the timing of the falling edge of the off clock signal OFF_CLK. The gate clock generation circuit (not illustrated) may generate a plurality of gate clock signals GCLK on the basis of a plurality of pulses which are sequentially transferred.

The gate clock generation circuit (not illustrated) may generate the gate clock signal GCLK having a uniform time period when the time periods of the pulse of the on clock signal ON_CLK and the pulse of the off clock signal OFF_CLK are uniform, but the present disclosure is not limited thereto.

The gate clock generation circuit (not illustrated) may generate the gate clock signal GCLK on the basis of the timing of the rising edge of the on clock signal ON_CLK and the timing of the falling edge of the off clock signal OFF_CLK according to a preset rule, but a clock start time point and a clock end time point of the gate clock signal GCLK may be controlled by a separate signal transferred from a timing controller (not illustrated).

Figure 8:
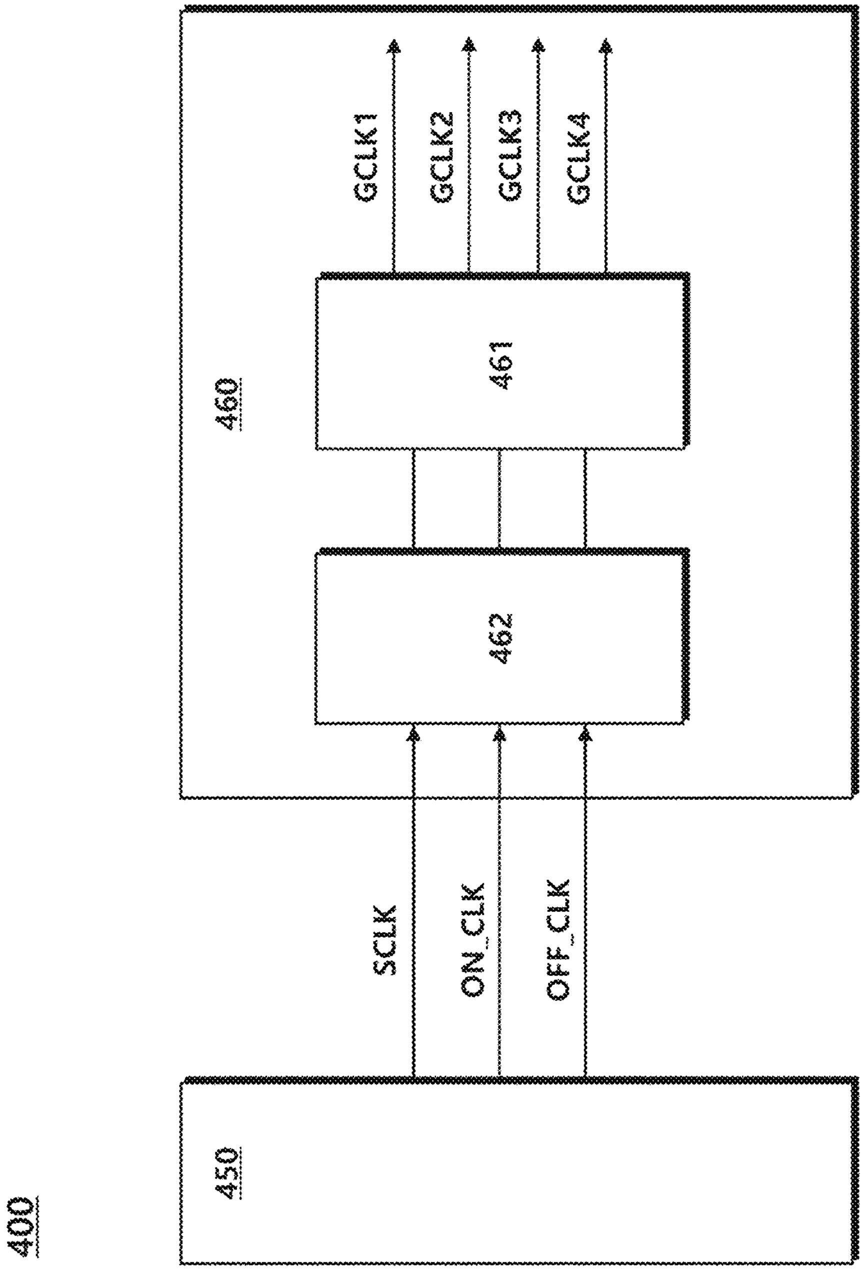
FIG. 8 is a diagram for explaining a power management integrated circuit including a gate clock modulation circuit in accordance with an embodiment.

FIG. 8 is a diagram for explaining a power management integrated circuit including a gate clock modulation circuit in accordance with an embodiment.

Figure 9:
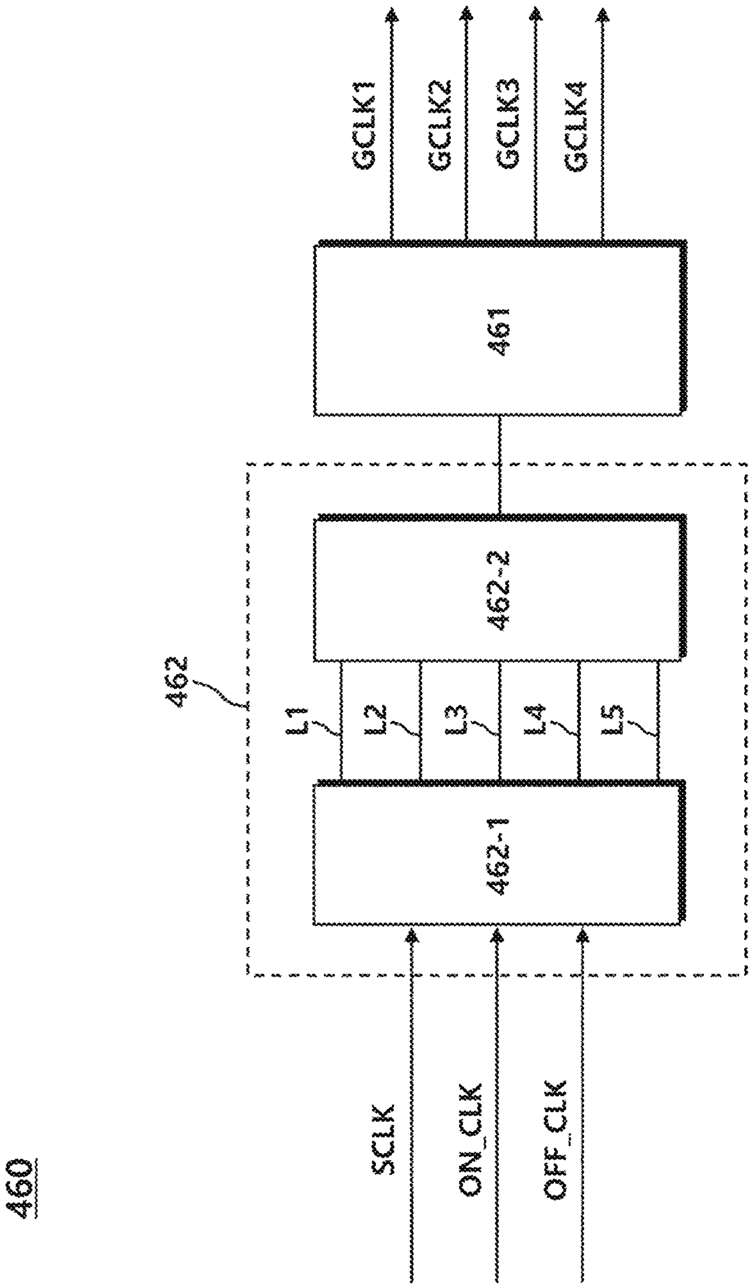
FIG. 9 is a diagram for explaining a gate clock modulation circuit in accordance with an embodiment.

FIG. 9 is a diagram for explaining a gate clock modulation circuit in accordance with an embodiment.

Referring to FIGS. 8 and 9, a display device 400 may include a timing controller 450 and a power management integrated circuit 460.

The timing controller 450 may transmit a start clock signal SCLK, an on clock signal ON_CLK and an off clock signal OFF_CLK to the power management integrated circuit 460 to control the output timing, intensity, phase, etc. of a gate driving circuit.

The power management integrated circuit (PMIC) 460 may include a gate clock generation circuit 461 and a gate clock modulation circuit 462.

The gate clock generation circuit 461 may generate a gate clock signal GCLK by using the on clock signal ON_CLK and the off clock signal OFF_CLK received from the timing controller 450, or may generate the gate clock signal GCLK by using a modulated on clock signal and a modulated off clock signal. If necessary, the modulated on clock signal or the modulated off clock signal may be defined as an on clock signal or an off clock signal.

The gate clock modulation circuit 462 may include a delay circuit 462-1 which is connected to the gate clock generation circuit 461 and outputs the on clock signal ON_CLK or the off clock signal OFF_CLK by delaying it by a preset time. As long as the gate clock modulation circuit 462 is a circuit capable of changing the output timing of the gate clock signal GCLK, the form and connection configuration thereof are not limited thereto.

A signal transferred to the delay circuit 462-1 may be a signal which includes at least one pulse transferred during a plurality of time periods, or may be at least one signal which is transferred during one time period.

The delay circuit 462-1 may include a plurality of signal lines or terminals having different delay times, for example, lns delay, 2 ns delay, 3 ns delay, etc. A multiplexer 462-2 which selects one among signals outputted from the delay circuit 462-1 may be connected to the output terminals of the delay circuit 462-1. In this case, a delay time may correspond to the magnitude of a voltage or a current, but a delay time or the magnitude of an analog signal may be variously set according to the characteristics of an internal circuit. The multiplexer 462-2 may be controlled through the timing controller 450 or an internal processor (not illustrated), and the operation of selecting one among the plurality of signal lines may have a random or constant rule. The multiplexer 462-2 may change an operation by receiving a multiplexer control signal which controls the multiplexer 462-2 to randomly select one among delayed signals transferred from a plurality of signal lines L1, L2, L3, L4 and L5 having different delay times. The multiplexer control signal may be a signal for causing the timing controller 450 or the internal processor to control the multiplexer 462-2.

The delayed signals transferred to the multiplexer 462-2 may be a plurality of delayed signals which are transferred during a plurality of time periods or may be a plurality of delayed signals which are transferred during one time period. For example, the delayed signals transferred to the multiplexer 462-2 may be a plurality of delayed signals which are sequentially transferred according to a time or may be a plurality of delayed signals which are transferred at the same time. The multiplexer 462-2 may change an operation according to the timing of the transferred signals.

The multiplexer 462-2 may be connected between the delay circuit 462-1 and the gate clock generation circuit 461 to select and output at least one among the signals transferred from the delay circuit 462-1. For example, when the plurality of delayed signals having passed through the plurality of signal lines in the delay circuit 462-1 have different delay times, the multiplexer 462-2 may select one among the plurality of delayed signals by the multiplexer control signal to randomly output the on clock signal ON_CLK or the off clock signal OFF_CLK.

The operation of the multiplexer 462-2 may be controlled by the multiplexer control signal which is transferred from the outside. However, an order and an interval of selecting the plurality of signal lines may be changed by an arbitrary rule determined by a register included in the multiplexer 462-2, for example, a rule included in a lookup table or a rule determined by a random number table.

The delay circuit 462-1 may be connected to an on clock line which transfers the on clock signal ON_CLK or an off clock line which transfers the off clock signal OFF_CLK, to delay and output an input signal.

The gate clock generation circuit 461 or the gate clock modulation circuit 462 may further include a level shifter which adjusts the signal level of the gate clock signal GCLK. The level shifter may have various connection relationships to adjust the signal level of the on clock signal ON_CLK or the off clock signal OFF_CLK or adjust the signal level of the gate clock signal GCLK. For example, the level shifter may be disposed such that the gate clock modulation circuit 462 is connected to the output terminal of the level shifter.

The level shifter of the power management integrated circuit 460 may operate to change the signal level of a low voltage signal inputted from the timing controller 450 or a system-on-chip (SoC) into the signal level of a high voltage signal. Since the high voltage signal outputted from the level shifter may exert great influence on electromagnetic interference (EMI), the gate clock signal GCLK may be changed to reduce the influence by the high voltage signal outputted from the level shifter.

A plurality of gate clock signals GCLK1 to GCLK4 generated by the gate clock generation circuit 461 may be transferred to a gate output stage circuit (not illustrated).

The gate output stage circuit (not illustrated) may receive the gate clock signal GCLK and generate a gate driving voltage to be transferred to a plurality of gate lines, and the timing of the gate driving voltage may be the same as or correspond to the timing of the gate clock signal GCLK.

The gate output stage circuit (not illustrated) may receive the output signal of the multiplexer 462-2 which is randomly selected, and may change the output timing of the gate driving voltage.

When a plurality of gate clock signals GCLK which have a random pattern are generated by the gate clock modulation circuit 462, the timing of the gate driving signal generated by the gate output stage circuit (not illustrated) may also have a random pattern. In this case, the timing of the gate driving signal or other driving signals driven inside a display device may be random, and since a driving frequency may variously spread, noise by electromagnetic interference (EMI) in the display device may be reduced.

Figure 10:
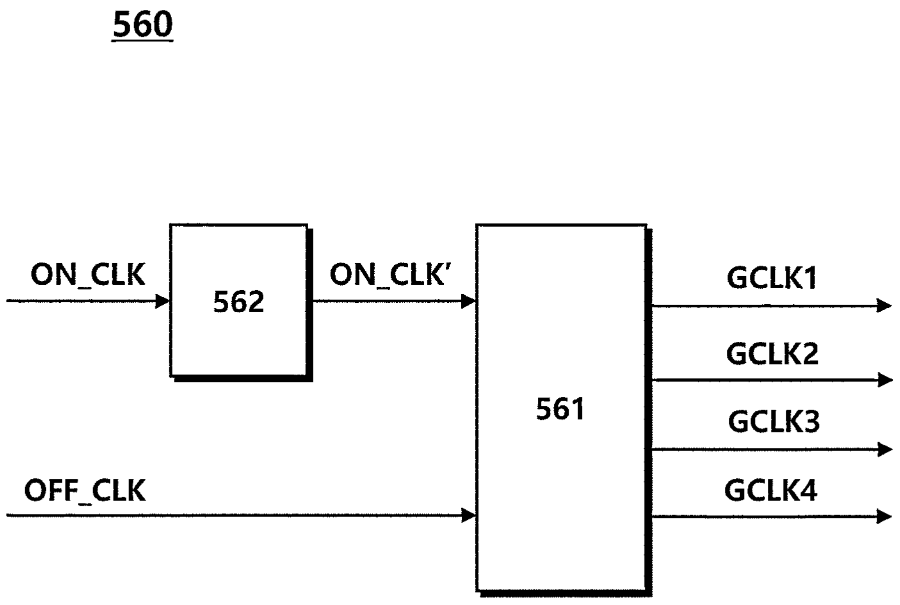
FIG. 10 is a first exemplary diagram for explaining various embodiments of the power management integrated circuit in accordance with the embodiment.

FIG. 10 is a first exemplary diagram for explaining various embodiments of the power management integrated circuit in accordance with the embodiment.

Figure 11:
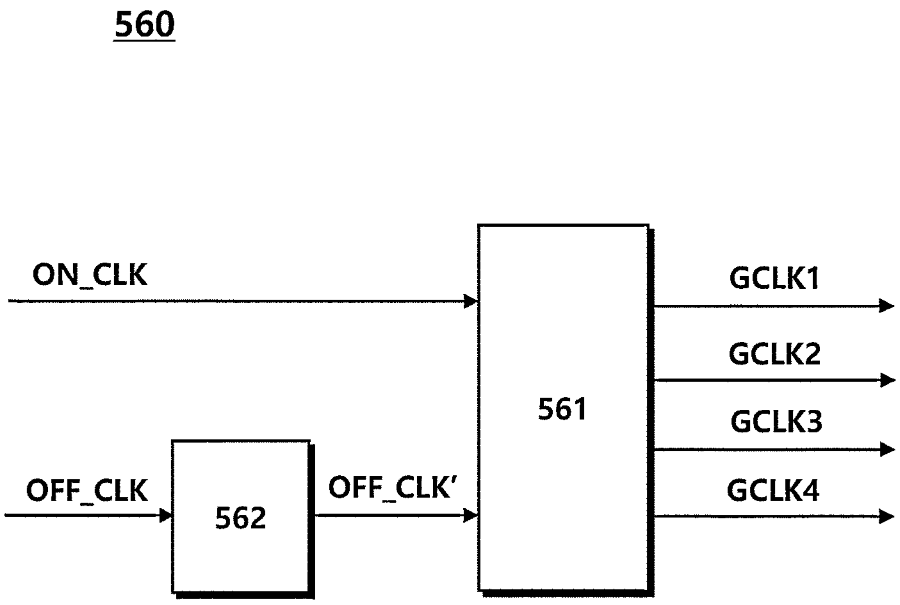
FIG. 11 is a second exemplary diagram for explaining various embodiments of the power management integrated circuit in accordance with the embodiment.

FIG. 11 is a second exemplary diagram for explaining various embodiments of the power management integrated circuit in accordance with the embodiment.

Referring to FIGS. 10 and 11, a power management integrated circuit 560 may include a gate clock generation circuit 561 and a gate clock modulation circuit 562.

The gate clock generation circuit 561 may receive an on clock signal ON_CLK and an off clock signal OFF_CLK including a plurality of pulses, and may generate a gate clock signal GCLK by using the rising timing of the pulse of the on clock signal ON_CLK and the falling timing of the pulse of the off clock signal OFF_CLK.

The gate clock generation circuit 561 may generate different types of gate clock signals according to the waveforms and timing of the on clock signal ON_CLK and a modulated on clock signal ON_CLK' transferred thereto. Also, the gate clock generation circuit 561 may generate different types of gate clock signals according to the waveforms and timing of the off clock signal OFF_CLK and a modulated off clock signal OFF_CLK' transferred thereto.

The gate clock modulation circuit 562 may be connected to the input terminal of the gate clock generation circuit 561 to randomly change the rising timing of the pulse of the on clock signal ON_CLK or the falling timing of the pulse of the off clock signal OFF_CLK. The gate clock modulation circuit 562 may be connected to the output terminal of the gate clock generation circuit 561 to randomly change the rising timing or falling timing of the pulses of a plurality of gate clock signals, for example, first to fourth gate clock signals GCLK1 to GCLK4. In this case, when the gate clock modulation circuit 562 independently changes the rising timing or falling timing of the pulses, the randomness of the gate clock signal GCLK generated by the gate clock generation circuit 561 is further increased.

The gate clock modulation circuit 562 may generate the modulated on clock signal ON_CLK' by changing a driving time point of the on clock signal ON_CLK as illustrated in FIG. 10, and may generate the modulated off clock signal OFF_CLK' by changing a driving time point of the off clock signal OFF_CLK as illustrated in FIG. 11. If necessary, by changing both driving time points of the on clock signal ON_CLK and the off clock signal OFF_CLK, the randomness of the gate clock signal GCLK may be increased.

The power management integrated circuit 560 including the gate clock modulation circuit 562 may change a start time point and an end time point of the gate clock signal GCLK, but may further include a switch (not illustrated), a multiplexer (not illustrated), a logic circuit (not illustrated), etc. to change together the waveform, cycle, operating time and signal level of the gate clock signal GCLK.

The gate clock modulation circuit 562 may include a plurality of signal lines for changing the timing of an input signal, and may change the timing of the input signal by randomly connecting one of the signal lines to an input port which receives the on clock signal ON_CLK or the off clock signal OFF_CLK. For example, when the gate clock modulation circuit 562 is a delay circuit which delays the timing of an input signal, each signal line may be a delay signal line which delays and outputs the input signal, and in this case, the on clock signal ON_CLK or the off clock signal OFF_CLK which is transferred to the input port of the delay circuit may be outputted by being delayed by a preset time.

The gate clock modulation circuit 562 may further include a multiplexer (not illustrated) or a demultiplexer (not illustrated) which outputs or receives an external control signal, for example, a control signal generated by a timing controller or a microcontroller unit, by randomly selecting at least one among a plurality of signal lines.

The random operation in the gate clock modulation circuit 562 may be an operation according to a sequence defined by a preset lookup table (LUT) or a lookup table (LUT) to be updated or an operation according to a sequence changed in real time according to an external control signal, for example, a control signal generated by the timing controller or the microcontroller unit, but the present disclosure is not limited thereto.

In addition, as long as the random operation in the gate clock modulation circuit 562 can induce the randomness of the output frequency of a gate driving circuit through the change of the input/output timing of the gate clock signal GCLK, various patterns of operations may be adopted. By repeatedly performing the random operation in the gate clock modulation circuit 562 at an interval equal to or corresponding to a preset multiple of, for example, two times or three times, the generation cycle of the gate clock signal GCLK generated by the gate clock generation circuit 561, it is possible to balance the degree of change in operating frequency and the amount of use of an internal memory.

Figure 12:
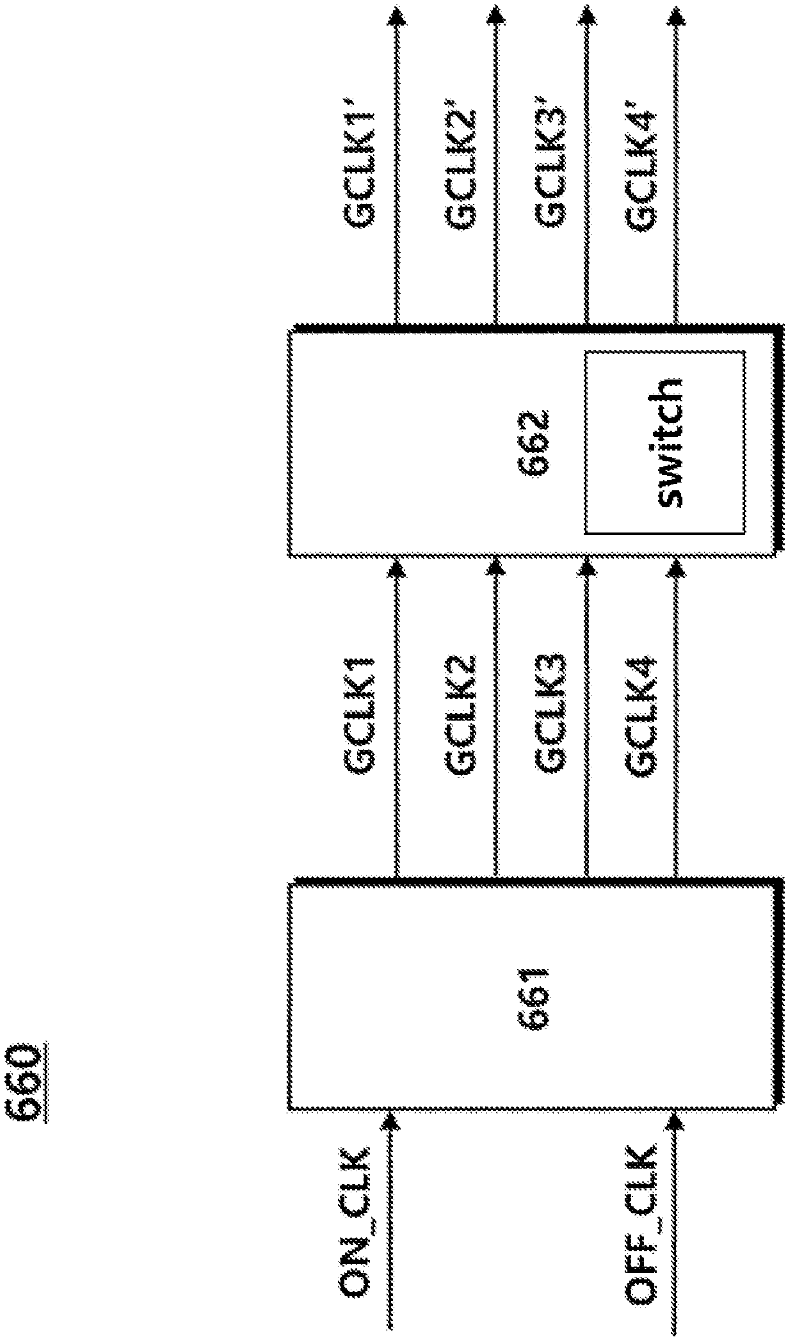
FIG. 12 is a third exemplary diagram for explaining various embodiments of the power management integrated circuit in accordance with the embodiment.

FIG. 12 is a third exemplary diagram for explaining various embodiments of the power management integrated circuit in accordance with the embodiment.

Referring to FIG. 12, a power management integrated circuit 660 may include a gate clock generation circuit 661 and a gate clock modulation circuit 662.

The gate clock generation circuit 661 may generate a plurality of gate clock signals GCLK by receiving an on clock signal ON_CLK which defines the output start timing of a gate driving circuit and an off clock signal OFF_CLK which defines the output end timing of the gate driving circuit.

The gate clock modulation circuit 662 may be connected to the output terminal of the gate clock generation circuit 661, and thereby, may generate modulated gate clock signals GCLK', for example, modulated first to fourth gate clock signals GCLK1' to GCLK4', by changing the rising timing or falling timing of the plurality of gate clock signals GCLK, for example, first to fourth gate clock signals GCLK1 to GCLK4.

In this case, the timing of the on clock signal ON_CLK and the off clock signal OFF_CLK is not directly changed, and the gate clock signal GCLK is directly changed. Therefore, since the rising timing and the falling timing of the gate clock signal GCLK may be simultaneously changed, it is possible to reduce the number of operation times of the gate clock modulation circuit 662.

The gate clock modulation circuit 662 may include a plurality of signal delay lines which have different delay times, and may change the timing of a final output signal by connecting at least one of the gate clock signals GCLK generated by the gate clock generation circuit 661 to at least one of the plurality of signal delay lines. All or some of the signal delay lines may be defined as a delay circuit (not illustrated).

The gate clock modulation circuit 662 may further include at least one switch (not illustrated) for connection of a signal line, and if necessary, the switch (not illustrated) may include a multiplexer (not illustrated) or a demultiplexer (not illustrated).

The switch (not illustrated) in the gate clock modulation circuit 662 may operate in correspondence to the generation cycle of the gate clock signal GCLK, and may be synchronized to operate within a preset time period before and after the rising edge or falling edge of the gate clock signal GCLK. For example, when six phases of the plurality of gate clock signals GCLK form one group and a cycle is repeated based on this, the switch (not illustrated) may operate in correspondence thereto.

Figure 13:
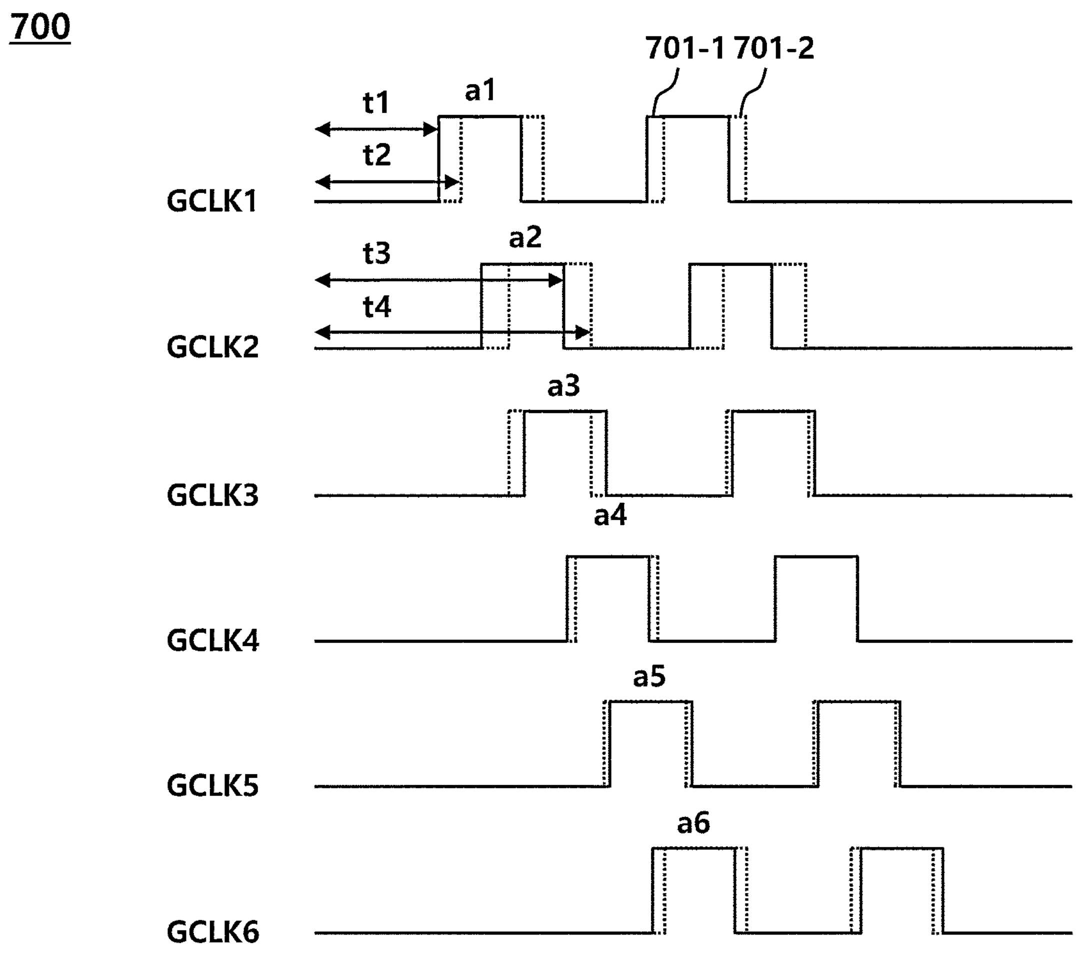
FIG. 13 is a timing diagram of gate clock signals outputted from a power management integrated circuit in accordance with an embodiment.

FIG. 13 is a timing diagram of gate clock signals outputted from a power management integrated circuit in accordance with an embodiment.

Referring to FIG. 13, a timing diagram 700 of a plurality of gate clock signals GCLK1 to GCLK6 is illustrated.

A timing diagram 701-1 in the case of not including a gate clock modulation circuit may be shown by solid lines, and a timing diagram 701-2 in the case of including a gate clock modulation circuit (not illustrated) may be shown by dotted lines.

When a gate clock modulation circuit is not included, the gate clock signals GCLK1 to GCLK6 generated by a gate clock generation circuit (not illustrated) are determined according to the timing of the on clock signal ON_CLK and the off clock signal OFF_CLK generated and transferred by a timing controller.

When a gate clock modulation circuit is not included and the pulse intervals of the on clock signal ON_CLK and the off clock signal OFF_CLK are constant, the pulse interval of the generated gate clock signal GCLK is also kept constant.

When the pulse interval of the gate clock signal GCLK is constant, a high voltage switching signal having a constant operating frequency is generated. Thus, a problem is caused in that electromagnetic interference (EMI) increases at the corresponding operating frequency. The high voltage switching signal may be a signal which is generated while a level shifter changes a low voltage signal into a high voltage signal, and in this case, random jitter may occur in the output of a gate driving circuit.

When a gate clock modulation circuit (not illustrated) according to an embodiment is included, the timing of the on clock signal ON_CLK, the off clock signal OFF_CLK and the gate clock signal GCLK may be variously changed. The gate clock modulation circuit (not illustrated) may be connected to the input terminal of the gate clock generation circuit to randomly change the timing of the on clock signal ON_CLK and the off clock signal OFF_CLK generated and transferred by the timing controller, or may be connected to the output terminal of the gate clock generation circuit to randomly change the timing of the gate clock signal GCLK generated by the gate clock generation circuit.

A gate clock modulation circuit (not illustrated) according to an embodiment may change the rising timing of a first pulse a1 of a first gate clock signal GCLK1 from a first time point t1 to a second time point t2. A gate clock modulation circuit (not illustrated) according to another embodiment may change the rising timing of a first pulse a2 of a second gate clock signal GCLK2 from a third time point t3 to a fourth time point t4. A gate clock modulation circuit (not illustrated) according to still another embodiment may change the rising timing or falling timing of the pulses a3, a4, a5 and a6 of third to sixth gate clock signals GCLK3 to GCLK6. Since some of the plurality of gate clock signals GCLK may have overlapping delay timing, a gate clock modulation circuit (not illustrated) may be configured to input and output signals in parallel through a plurality of signal modulation lines in order for more efficient modulation of gate clock signals.

A power management integrated circuit including a gate clock modulation circuit (not illustrated) may randomly change the waveforms, timing, etc. of the plurality of gate clock signals GCLK to cause the spreading of operating frequencies, and thus, noise by electromagnetic interference (EMI) may be reduced due to the characteristics of various driving frequencies.

What is claimed is:

1. A power management integrated circuit which is connected to a timing controller transmitting first to third clock signals through only three first signal lines and connected to a gate driving circuit receiving gate driving signals through second signal lines more than the number of the first signal lines, comprising:

a logic combination circuit configured to generate the gate driving signals for the gate driving circuit based on the first to third clock signals input from the timing controller through the only three first signal lines, wherein the logic combination circuit includes:

a logic circuit configured to output a gate start signal and a gate reset signal based on the first to third clock signals to the gate driving circuit through separate logic operations;

a gate clock generating circuit configured to generate the gate clock signals by performing logical operations on the first to third clock signals transferred from the logic circuit, a delay circuit configured to receive the first to third clock signals, at least one of the first to third clock signals including one pulse transferring in one or more time intervals, to delay and to output the second clock signal or the third clock signal; and a multiplexer connected to the delay circuit, wherein the delay circuit is configured to output a plurality of delayed signals on the second clock signal or the third clock signal with different delay times to the multiplexer through a plurality of signal lines, wherein the delay circuit has more output signal lines than input signal lines, wherein the multiplexer is configured to randomly select one among the plurality of delayed signals outputted from the delay circuit by receiving a multiplexer control signal and output the selected one to the gate clock generating circuit to generate clock signals, wherein the first clock signal is a start clock signal, the second clock signal is to set an output start time point of the gate driving circuit, and the third clock signal is to set an initialization time point of the gate driving circuit, wherein the power management integrated circuit is configured to provide a power to the timing controller and the gate driving circuit, and form the predetermined signal lines with the timing controller as the number of clock signals transferred from the timing controller to the power management integrated circuit, wherein the gate driving circuit comprises a gate output stage circuit including a plurality of gate output stages to which are sequentially connected, the plurality of gate output stages including at least one gate output stage which drives a dummy logic, wherein a first gate output stage is configured to receive a gate start signal to determine a start time point of gate driving and a gate reset signal to determine an end time point or an initialization time point of the gate driving, transfer a gate driving volage to a gate line which is connected to an output terminal of the first gate output stage and determine an output time point of the gate driving circuit based on a first gate clock signal, wherein other gate output stages are configured to receive a gate reset signal to determine an end time point or an initialization time point of the gate driving, transfer a gate driving volage to a gate line which is connected to an output terminal of a corresponding gate output stage and determine an output time point of the gate driving circuit based on a corresponding gate clock signal based on the second clock signal and the third clock signal, wherein a gate driving voltage of a previous gate output stage used for a gate start signal of a next gate output stage as a gate start signal, wherein the gate clock modulation circuit is connected to one of an input terminal or an output terminal of the gate clock generation circuit to randomly change the timing of the second and third clock signals generated and transferred by a timing controller, wherein the gate clock modulation circuit is configured to control a pulse width and a pulse interval of each pulse of the respective gate clock signals and each of the gate clock signals by changing at least one of a rising timing or a falling timing of each pulse of the respective gate clock signals, and wherein the gate clock modulation circuit is configured to input and output signals in parallel through a plurality of signal modulation lines in order for modulation of gate clock signals.

2. The power management integrated circuit according to claim 1, further comprising:

a level shifter configured to receive an output signal outputted from the multiplexer and to adjust the level of the gate clock signal.

3. The power management integrated circuit according to claim 1, wherein the gate output stage circuit is configured to receive the output signal of the multiplexer, which is randomly selected.

4. A display device, comprising:

a timing controller configured to transmit first to third clock signals;

a gate driving unit configured to receive gate driving signals through second signal lines more than the number of the first three signal lines; and a power management integrated circuit configured to provide a power to the timing controller and the gate driving circuit, and form first signal lines with the timing controller as the number of clock signals transferred from the timing controller to the power management integrated circuit, wherein the power management integrated circuit includes:

a gate clock generation circuit configured to receive an on clock signal and an off clock signal, among the on and off clock signals, including a plurality of pulses and to generate a gate clock signal by using a rising timing of a pulse of the on clock signal and a falling timing of a pulse of the off clock signal;

a gate clock modulation circuit connected to the gate clock generation circuit and configured to change the rising timing or the falling timing of a pulse of the gate clock signal, wherein the gate clock modulation circuit includes a delay circuit configured to delay and output the on and off clock signals, wherein the delay circuit is configured to receive the first to third clock signals, and at least one of the first to third clock signals includes one pulse transferring in one or more time interval intervals, wherein the delay circuit is configured to output a plurality of delayed signals on the second clock signal or the third clock signal to the multiplexer in different delay times through a plurality of signal lines, wherein the delay circuit has more output signal lines than input signal lines, wherein the multiplexer is configured to randomly select one among the plurality of delayed signals outputted from the delay circuit by receiving a multiplexer control signal and output the selected one to the gate clock generating circuit to generate clock signals, and wherein the first to third clock signals include a start clock signal, the on clock signal for setting an output start time point of a gate driving circuit and the off clock signal for setting an initialization time point of the gate driving circuit, and wherein the power management integrated circuit is configured to provide a power to a timing controller and the gate driving circuit, and form signal lines with the timing controller as the number of clock signals transferred from the timing controller to the power management integrated circuit, wherein the gate driving circuit comprises a gate output stage circuit including a plurality of gate output stages to which are sequentially connected, the plurality of gate output stages including at least one gate output stage which drives a dummy logic, wherein a first gate output stage is configured to receive a gate start signal to determine a start time point of gate driving and a gate reset signal to determine an end time point or an initialization time point of the gate driving, transfer a gate driving volage to a gate line which is connected to an output terminal of the first gate output stage and determine an output time point of the gate driving circuit based on a first gate clock signal, wherein other gate output stages are configured to receive a gate reset signal to determine an end time point or an initialization time point of the gate driving, transfer a gate driving volage to a gate line which is connected to an output terminal of a corresponding gate output stage and determine an output time point of the gate driving circuit based on a corresponding gate clock signal based on the on clock signal and the off clock signal, wherein a gate driving voltage of a previous gate output stage is used for a gate start signal of a next gate output stage as a gate start signal, wherein the gate clock modulation circuit is connected to one of an input terminal or an output terminal of the gate clock generation circuit to randomly change the timing of the second and third clock signals generated and transferred by the timing controller, wherein the gate clock modulation circuit is configured to control a pulse width and a pulse interval of each pulse of the respective gate clock signals and each of the gate clock signals by changing at least one of a rising timing or a falling timing of each pulse of the respective gate clock signals, and wherein the gate clock modulation circuit is configured to input and output signals in parallel through a plurality of signal modulation lines in order for modulation of gate clock signals.

5. The display device according to claim 4, wherein the gate clock modulation circuit is connected to an input terminal of the gate clock generation circuit and is configured to randomly change the rising timing of the pulse of the on clock signal or the falling timing of the pulse of the off clock signal.

6. The display device according to claim 4, wherein the gate clock modulation circuit includes the plurality of signal lines for changing the timing of an input signal and is configured to change the timing of the input signal by randomly connecting one of the signal lines to a port which receives the on clock signal or the off clock signal.

7. The display device according to claim 4, wherein the gate clock modulation circuit is disposed between the timing controller and the gate clock generation circuit and is connected to at least one of an on clock signal line for transferring the on clock signal from the timing controller and an off clock signal line for transferring the off clock signal from the timing controller.

8. The display device according to claim 4, wherein the gate clock modulation circuit is configured to change the rising timing of the pulse of the gate clock signal according to a preset lookup table.

9. The display device according to claim 4, wherein the gate clock generation circuit is configured to generate a plurality of gate clock signals repeatedly with a preset cycle and the gate clock modulation circuit separately modulates the rising timings or the falling timings of the plurality of gate clock signals.

10. The display device according to claim 4, wherein the gate output stage is configured to change frequencies of the gate driving signals in response to the rising timing or falling timing of the pulse of the gate clock signal.

* * * * *